(12) United States Patent
Wang et al.

(10) Patent No.: US 8,781,540 B2
(45) Date of Patent: Jul. 15, 2014

(54) PORTABLE ELECTRONIC DEVICE

(75) Inventors: Kai-Ta Wang, Taoyuan County (TW); Hsi-Hsing Hsu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 490 days.

(21) Appl. No.: 12/512,995

(22) Filed: Jul. 31, 2009

(65) Prior Publication Data

US 2010/0048263 A1  Feb. 25, 2010

Related U.S. Application Data

(60) Provisional application No. 61/091,716, filed on Aug. 25, 2008.

(51) Int. Cl.
 *H04M 1/00* (2006.01)
(52) U.S. Cl.
 USPC ..................... 455/575.4; 455/575.1
(58) Field of Classification Search
 USPC ...................... 455/575.1, 575.2, 575.3, 575.4
 See application file for complete search history.

(56) References Cited

U.S. PATENT DOCUMENTS

| | | | |
|---|---|---|---|
| 5,548,478 | A | 8/1996 | Kumar et al. |
| 6,539,208 | B1 | 3/2003 | Mori |
| 6,850,226 | B2 | 2/2005 | Finke-Anlauff |
| 7,162,283 | B2 | 1/2007 | Bae et al. |
| 7,184,806 | B2 | 2/2007 | Bae |
| 7,448,872 | B2 * | 11/2008 | Im ................................. 439/10 |
| 2004/0203496 | A1 | 10/2004 | Bae et al. |
| 2005/0245251 | A1 | 11/2005 | Lee et al. |
| 2005/0255897 | A1 | 11/2005 | Lee et al. |
| 2006/0084303 | A1 | 4/2006 | Lee |
| 2006/0154703 | A1 | 7/2006 | Kim |
| 2006/0172786 | A1 | 8/2006 | Lo |
| 2006/0178176 | A1 | 8/2006 | Kwak et al. |
| 2006/0211460 | A1 | 9/2006 | Jeong et al. |
| 2006/0231620 | A1 | 10/2006 | Kim et al. |
| 2006/0231629 | A1 | 10/2006 | Massieu |
| 2006/0252471 | A1 | 11/2006 | Pan |

(Continued)

FOREIGN PATENT DOCUMENTS

| | | |
|---|---|---|
| CN | 2798518 | 7/2006 |
| TW | M297113 | 9/2006 |

OTHER PUBLICATIONS

"1st Office Action of China Counterpart Application" issued on Feb. 5, 2010, p. 1-p. 4.

*Primary Examiner* — Kent Chang
*Assistant Examiner* — Scott Au
(74) *Attorney, Agent, or Firm* — Jianq Chyun IP Office

(57) ABSTRACT

A portable electronic device having an immovable body, a movable body, and a sliding module. The sliding module has a fixing frame fixed to the immovable body, a movable frame fixed to the movable body and slidably coupled to the fixing frame, and an elastic element having a fixing end fixed to the fixing frame and a movable end fixed to the movable frame. When the movable body slides with respect to the immovable body from a first position to a second position by the sliding module, the movable end relatively moves from a first stop position to a second stop position along a moving path. The distance from the orthographic projection of the fixing end on the moving path to the first stop position is larger than the distance from the orthographic projection of the fixing end on the moving path to the second stop position.

21 Claims, 18 Drawing Sheets

(56) References Cited

U.S. PATENT DOCUMENTS

| | | |
|---|---|---|
| 2006/0293094 A1 | 12/2006 | Kilpi et al. |
| 2007/0049075 A1 | 3/2007 | Kim et al. |
| 2007/0105606 A1* | 5/2007 | Yoon et al. ................ 455/575.4 |
| 2008/0051163 A1* | 2/2008 | Kim et al. ................ 455/575.4 |
| 2008/0090627 A1* | 4/2008 | Jeong et al. ............. 455/575.4 |
| 2008/0153558 A1* | 6/2008 | Mifune et al. ........... 455/575.4 |
| 2008/0194304 A1* | 8/2008 | Satoshi et al. ........... 455/575.4 |
| 2008/0261659 A1* | 10/2008 | Jang et al. ................ 455/566 |

\* cited by examiner

PORTABLE ELECTRONIC DEVICE

This application claims the priority benefit of U.S. provisional application Ser. No. 61/091,716, filed on Aug. 25, 2008. The entirety of the above-mentioned patent application is hereby incorporated by reference herein and made a part of this specification.

BACKGROUND OF THE INVENTION

1. Field of the Invention

The present invention relates to a portable electronic device, and in particular, to a portable electronic device having bodies capable of sliding with respect to each other.

2. Description of Related Art

A portable electronic device is an electronic device which can be carried around with ease. Moreover, the portable electronic device is small and light, such that a user may carry it conveniently. The most common portable electronic devices are, for example, a mobile phone, a multimedia player, a personal digital assistance (PDA), a PDA phone, a handheld game console, a handheld global positioning system, and a notebook.

In order to improve the convenience for typing, the portable electronic device may include a standard keyboard. However, if the keyboard and a display are on the same side of the device, the device must have a larger area on one side. Therefore, the portable electronic devices in the current market mainly utilize a two-layer foldable design or a two-layer sliding type design, so that the display and the keyboard may be disposed respectively on two overlapping machine bodies, and thereby the area of the portable electronic device may be reduced.

SUMMARY OF THE INVENTION

The present invention discloses a portable electronic device having an immovable body, a movable body, and a sliding module disposed between the immovable body and the movable body. The movable body slides, with respect to the immovable body, between a first position and a second position by means of the sliding module. The sliding module has a fixing frame, a movable frame, and an elastic element. The fixing frame is fixed to the immovable body. The movable frame is fixed to the movable body and slidably coupled to the fixing frame. The elastic element has a fixing end fixed to the fixing frame and a movable end fixed to the movable frame. When the movable body slides from the first position to the second position, the movable end relatively moves from a first stop position to a second stop position along a moving path. The distance from the orthographic projection of the fixing end on the moving path to the first stop position is larger than the distance from the orthographic projection of the fixing end on the moving path to the second stop position.

According to one embodiment of the present invention, the portable electronic device further comprises a rotation module and a restraint mechanism. The rotation module is coupled between the fixing frame and the immovable body. The movable body is rotatable with respect to the immovable body between the second position and a third position by means of the rotation module. The restraint mechanism includes a blocker on the movable frame, a magnetic element disposed on the immovable body, and a restraint leaf spring having a fixing end fixed to the fixing frame and a free end having a first edge. When the movable body slides between the first position and the second position, the free end of the restraint leaf spring is attached to the fixing frame by means of the magnetic attraction force of the magnetic element; and when the movable body rotates between the second position and the third position, the free end of the restraint leaf spring is not attracted by the magnetic element and released from the fixing frame, so that the first edge is against the blocker for resisting a pushing force exerted by the blocker, and thereby the movable body is restricted from sliding with respect to the immovable body.

According to one embodiment of the present invention, the rotation module further comprises at least a pivot, at least a bearing and a restraint element. The pivot has a first section connected to the immovable body and a second section. The bearing is connected to the sliding module and coupled with the second section of the pivot. The restraint element covers at least a portion of the bearing and has a restraint end, and when the movable body rotates to the third position, the restraint end withstands the immovable body.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
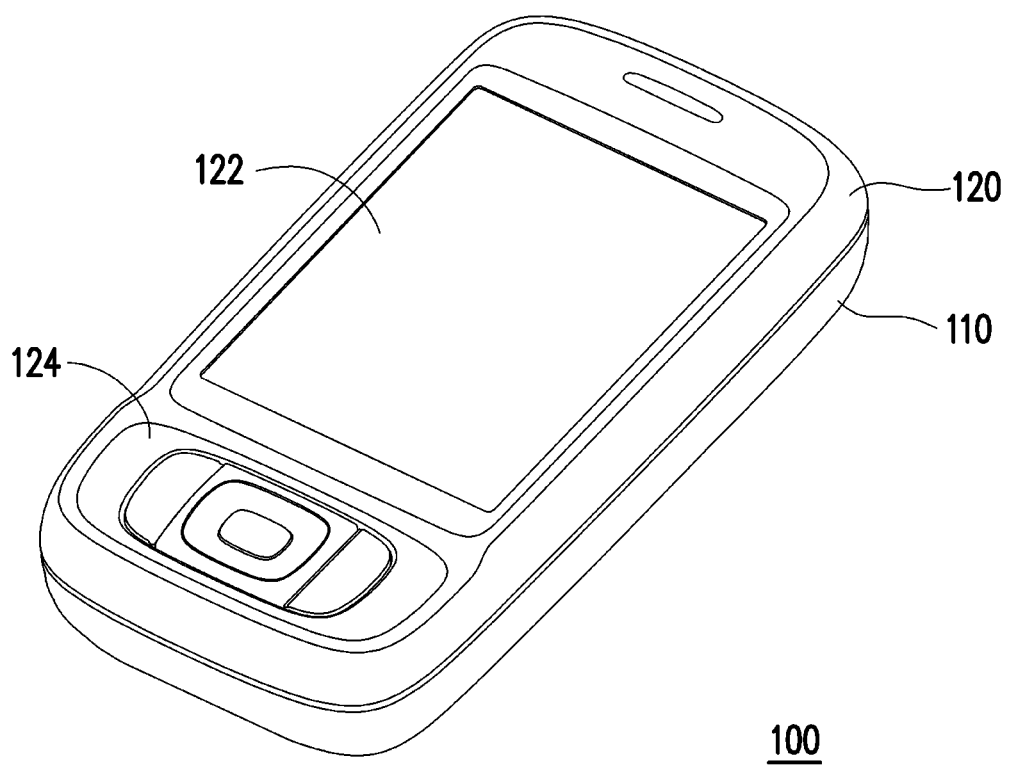
FIG. 1A is a portable electronic device according to one embodiment of the present application.

Reference will now be made in detail to the present embodiments of the invention, examples of which are illustrated in the accompanying drawings. Wherever possible, the same reference numbers are used in the drawings and the description to refer to the same or like parts.

Referring to FIG. 1A, the portable electronic device 100 of the present embodiment includes an immovable body 110 and a movable body 120 overlapping with the immovable body 110. The movable body 120 may include a display 122 and a button set 124. Therefore, the portable electronic device 100 may be operated through the display 122 and the button set 124.

Figure 1B:
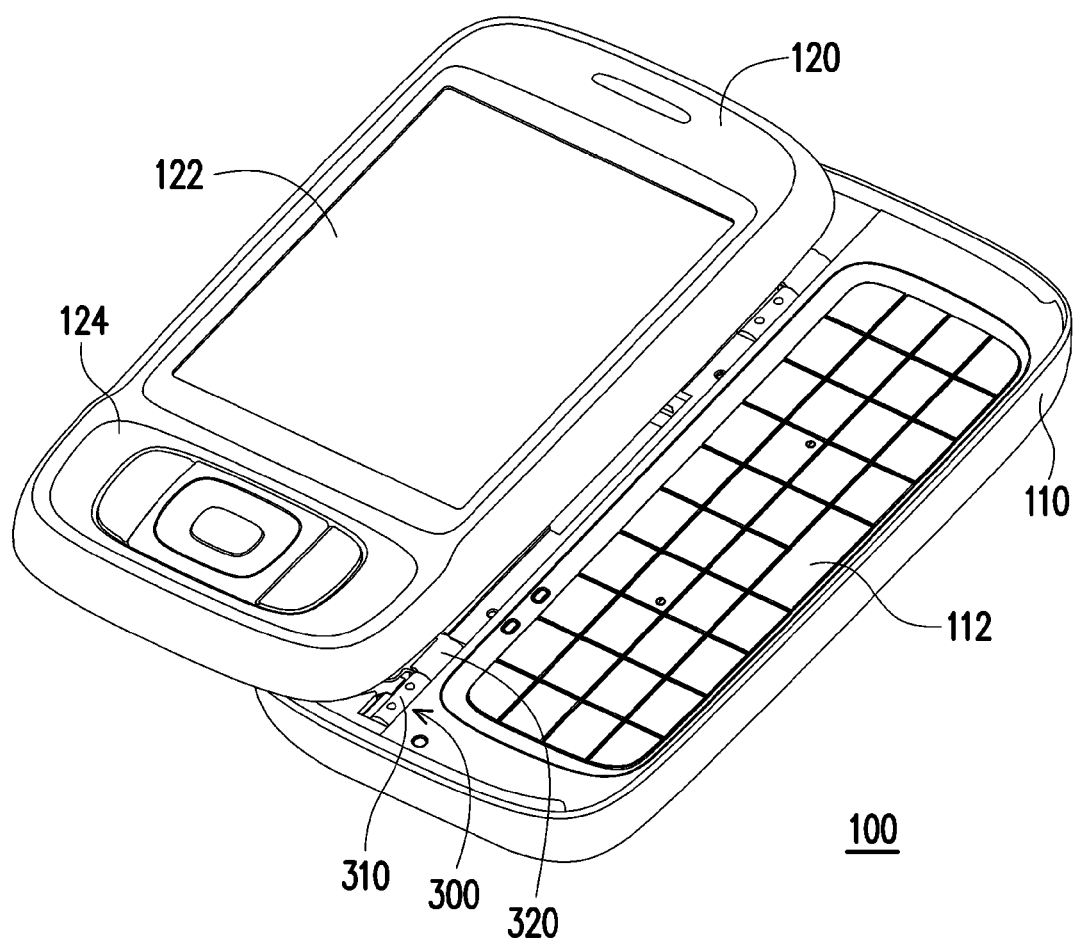
FIG. 1B illustrates that the movable body of FIG. 1A slides with respect to the immovable body from the first position to the second position.
Figure 2:
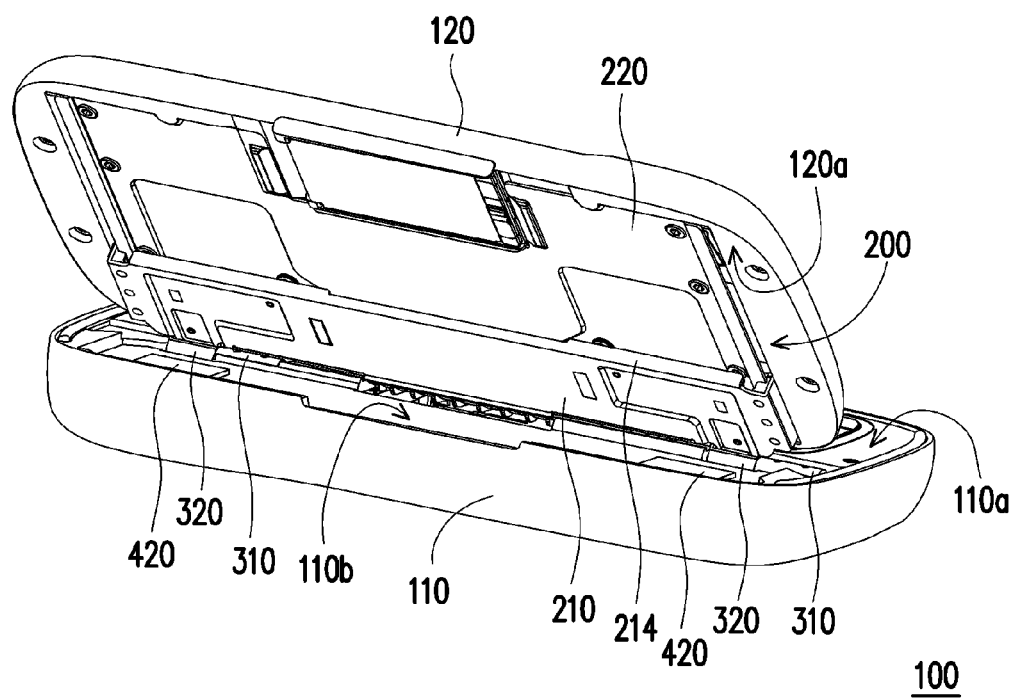
FIG. 2 illustrates FIG. 1C from another viewing angle.

Referring to FIGS. 1B and 2, the portable electronic device 100 further includes a sliding module 200 shown in FIG. 2 and a rotation module 300 shown in FIG. 1B. As shown in FIG. 2, the sliding module 200 is disposed on the movable body 120. The rotation module 300 is coupled between the sliding module 200 and the immovable body 110.

Figure 1C:
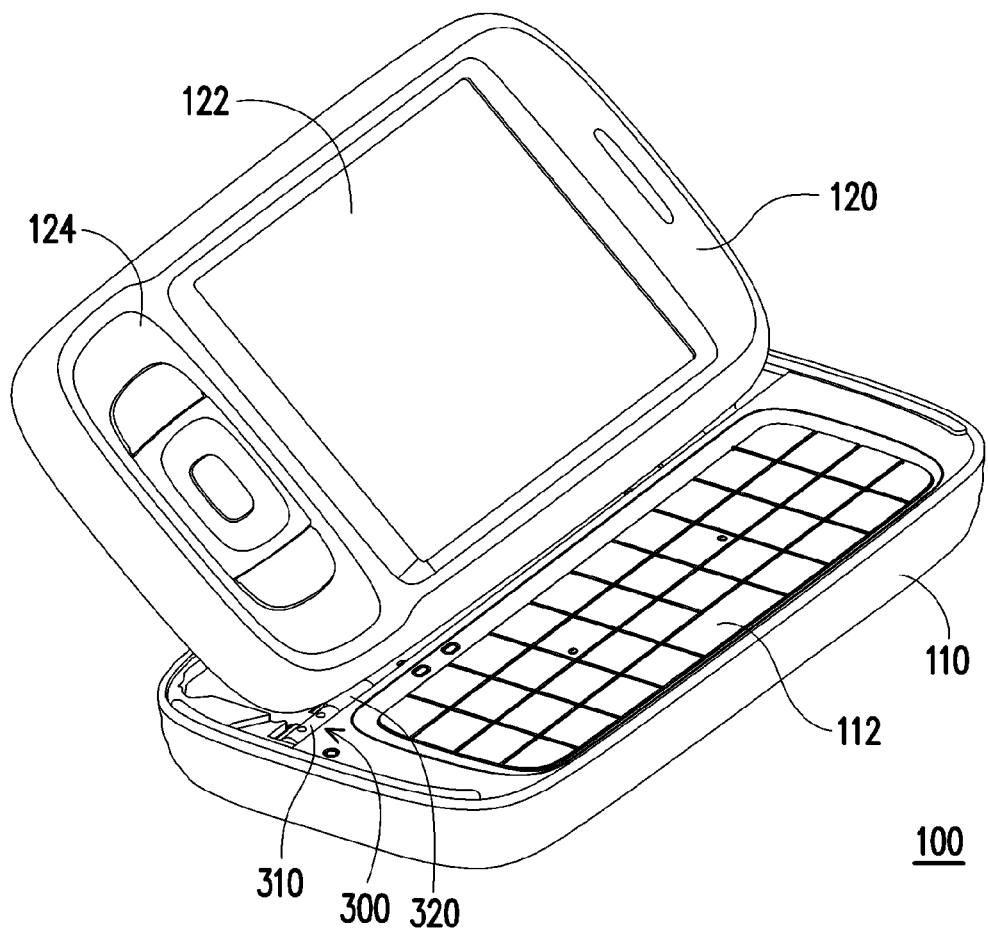
FIG. 1C illustrates that the movable body of FIG. 1B rotates with respect to the immovable body from the second position to the third position.

Referring to FIGS. 1A to 1C, the movable body 120 is slidable with respect to the immovable body 110 between a first position of FIG. 1A and a second position of FIG. 1B. Furthermore, the movable body 120 is further rotatable with respect to the immovable body 110 between the second position of FIG. 1B and a third position of FIG. 1C by means of the rotation module 300.

Referring to FIGS. 1A and 1B, the immovable body 110 further has a keyboard 112. When the movable body 120 slides to the first position of FIG. 1A, the keyboard 112 is covered by the movable body 120. Furthermore, when the movable body 120 slides to the second position of FIG. 1B, the keyboard 112 is exposed outside of the movable body 120, and the keyboard 112 and the display 122 face toward the same direction. Therefore, the portable electronic device 100 may be operated through the keyboard 112 and the display 122.

Figure 3:
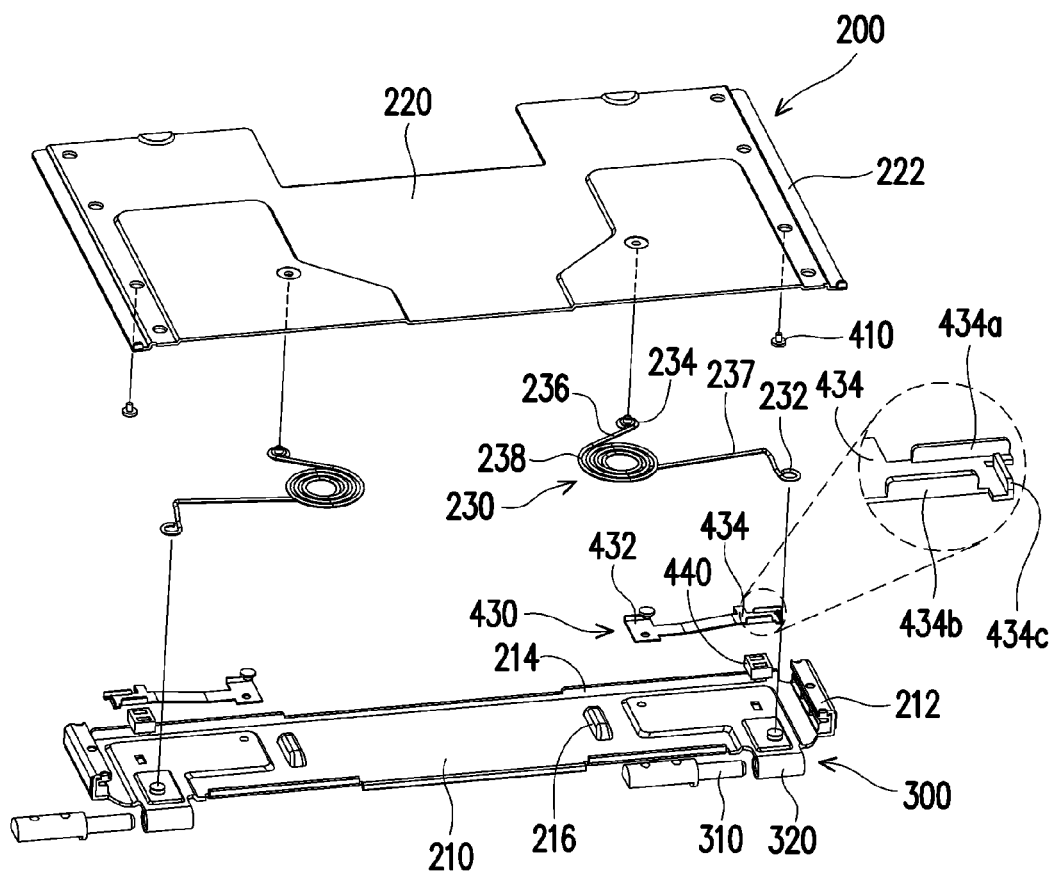
FIG. 3 is an exploded view of the sliding module and the rotation module of FIG. 2A.

Referring to FIGS. 2 and 3, the sliding module 200 has a fixing frame 210 and a movable frame 220. The fixing frame 210 is connected to the rotation module 300. The movable frame 220 is fixed to a back surface 120a of the movable body 120 and slidably coupled to the fixing frame 210. Therefore, the movable body 120 may slide with respect to the immovable body 110 between the first position of FIG. 1A and the second position of FIG. 1B through the fixing frame 210 and the movable frame 220 by the external force.

Referring to FIG. 3, in the present embodiment, the movable frame 220 may have two edges 222 parallel to each other, and the fixing frame 210 may have two corresponding hooks 212 slidably coupled with the edges 222 respectively. Thus, the movable frame 220 may slide with respect to the fixing frame 210 by means of the edges 222 and the hooks 212. Furthermore, the fixing frame 210 may further include a plurality of buffer bumps 216 disposed on the fixing frame 210 for blocking the movable frame 220, so that at least a distance is kept between the fixing frame 210 and the movable frame 220.

Referring to FIGS. 1B, 2, and 3, the rotation module 300 has two pivots 310 and two bearings 320 rotatably coupled with the pivots 310. Each of the pivots 310 has a segment screwed on the immovable body 110, and the bearings 320 is fixed to the fixing frame 210 of the sliding module 200. Therefore, the movable body 120 may be forced to rotate with respect to the immovable body 110 between the second position of FIG. 1B and the third position of FIG. 1C by means of the rotation module 300.

Referring to FIG. 2, the immovable body 110 has an upper surface 110a, and the upper surface 110a provided with a trench 110b thereon for accommodating the fixing frame 210 and the rotation module 300. When the movable body 120 slides between the first position of FIG. 1A and the second position of FIG. 1B, the fixing frame 210 is accommodated in the trench 110b. When the movable body 120 rotates from the second position of FIG. 1B to the third position of FIG. 1C, the fixing frame 210 moves away from the trench 110b, as shown in FIG. 2.

Figure 4:
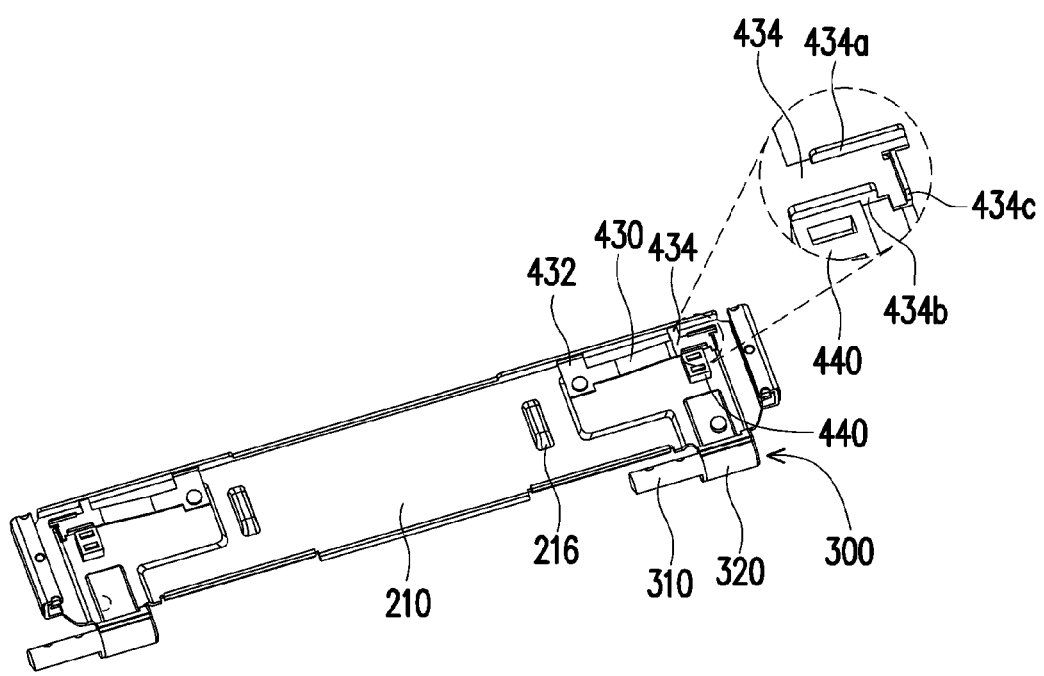
FIG. 4 illustrates the constitution of the fixing frame of FIG. 3.
Figure 5:
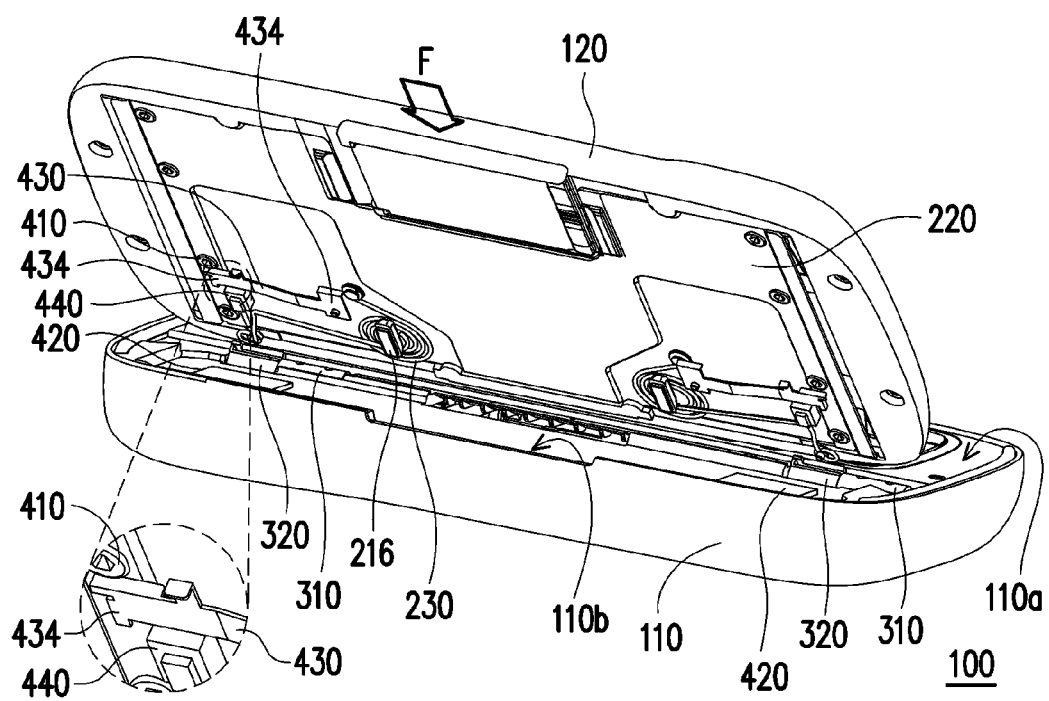
FIG. 5 illustrates the portable electronic device hidden behind the fixing frame of FIG. 2.

Please refer to FIGS. 3, 4, and 5, wherein the fixing frame 210 of FIG. 3 is hidden in FIG. 5. The portable electronic device 100 further includes a restraint mechanism. The restraint mechanism, the sliding module 200 and the rotation module 300 constitute a moving assembly. The restraint mechanism further has a blocker 410 disposed on the movable frame 220. The restraint mechanism further has a magnetic element 420 disposed on the immovable body 110. The restraint mechanism further has a restraint leaf spring 430. The restraint leaf spring 430 has a fixing end 432 fixed to the fixing frame 210 and a free end 434, and the free end 434 has a first edge 434a. According to the present embodiment, the blocker 410 may be a screw, so as to screw the movable frame 220 on the movable body 120.

Figure 6A:
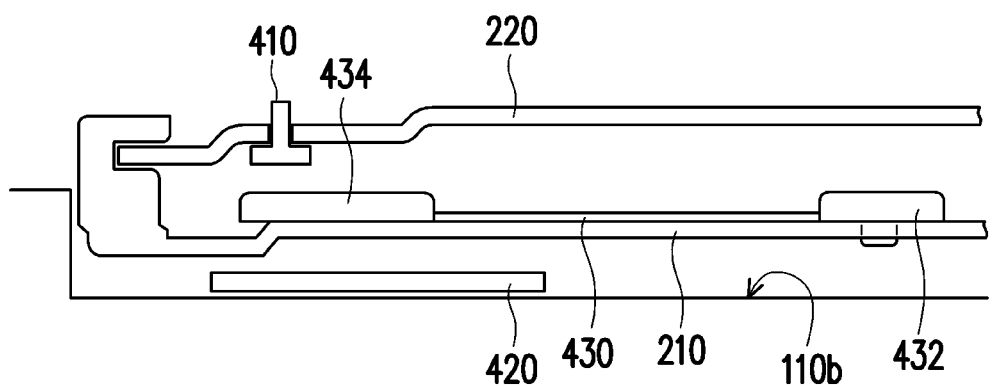
FIGS. 6A and 6B illustrate the restraint leaf spring attracted or not attracted by the magnetic element.

When the movable body 120 slides with respect to the immovable body 110 between the first position of FIG. 1A and the second position of FIG. 1B, the free end 434 of the restraint leaf spring 430 is attached to the fixing frame 210 through magnetic attraction force of the magnetic element 420, as shown in FIG. 6A.

Figure 6B:
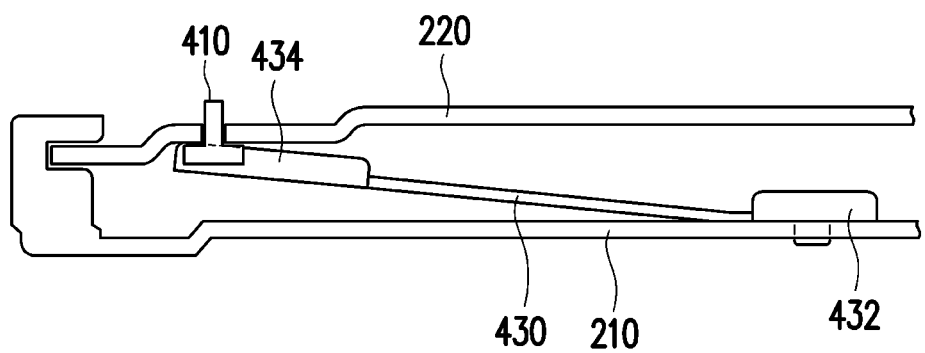

When the movable body 120 rotates with respect to the immovable body 110 between the second position of FIG. 1B and the third position of FIG. 1C, the free end 434 of the restraint leaf spring 430 is not attracted by the magnetic element 420 and is released from the fixing frame 210, as shown in FIG. 6B, and the first edge 434a is against the blocker 410 to resist a pushing force F exerted by the blocker 410, so as to restrict the movable body 120 from sliding with respect to the immovable body 110, as shown in FIG. 5.

Referring to FIGS. 3, 4, and 5, the restraint mechanism further includes a supporting element 440 disposed on the fixing frame 210, and the free end 434 includes a second edge 434b toward the supporting element 440. When the free end 434 of the restraint leaf spring 430 is released from the fixing frame 220, the supporting element 440 supports the second edge 434b to resist the pushing force F exerted by the blocker 410.

Referring to FIGS. 3, 4, and 5, the free end 434 of the restraint leaf spring 430 further has an inclined surface 434c corresponding to the first edge 434a for guiding the free end 434 passing through the blocker 410 and thus making the first edge 434a return to be against the blocker 410 again.

Referring to FIG. 3, in order to enable self-automatic sliding, the sliding module 200 further has an elastic element 230 which includes a fixing end 232 fixed to the fixing frame 210 and a movable end 234 fixed to the movable frame 220. According to the present embodiment, the elastic element 230 further has a first rod 236 connected to the movable end 234, a second rod 237 connected to the fixing end 232, and an elastic main body 238 connected between the first rod 236 and the second rod 237, wherein the second rod 237 is longer than the first rod 236. According to the present embodiment, the elastic element 230 may be a torsion spring.

Figure 7A:
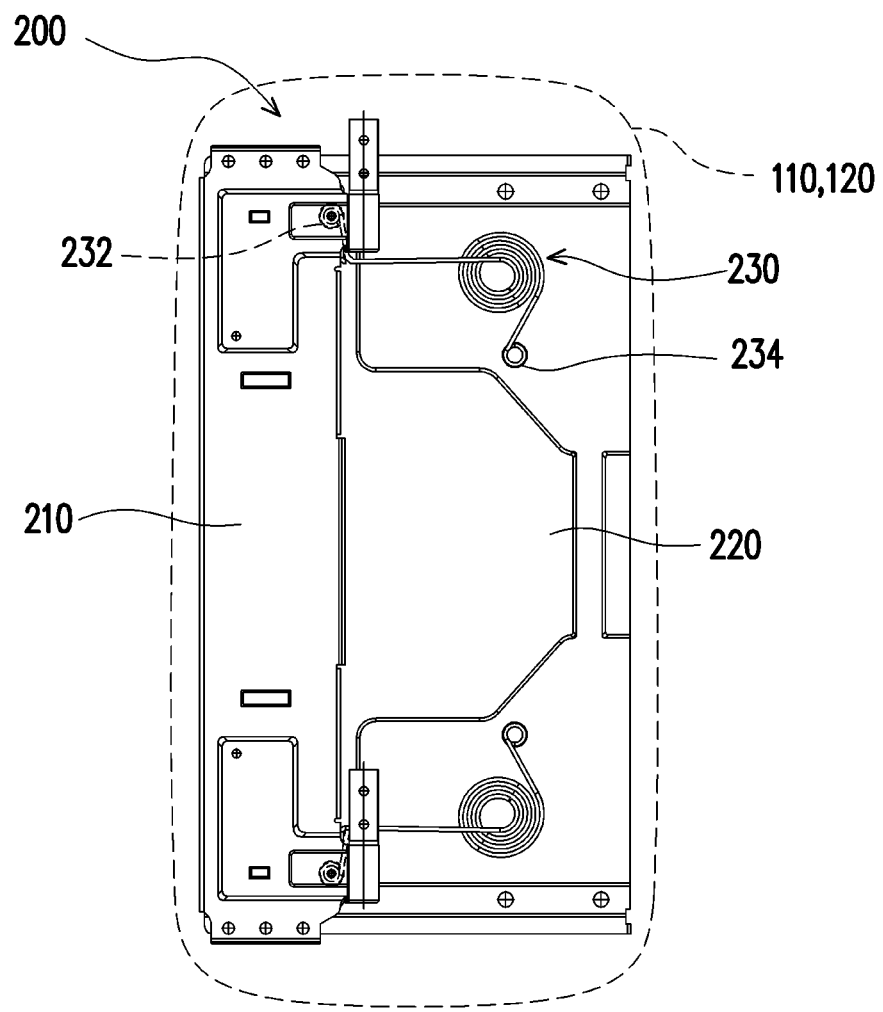
FIGS. 7A and 7B are bottom views illustrating the fixing frame, the movable frame, and the elastic element of FIG. 2 before operation and after operation.
Figure 7B:
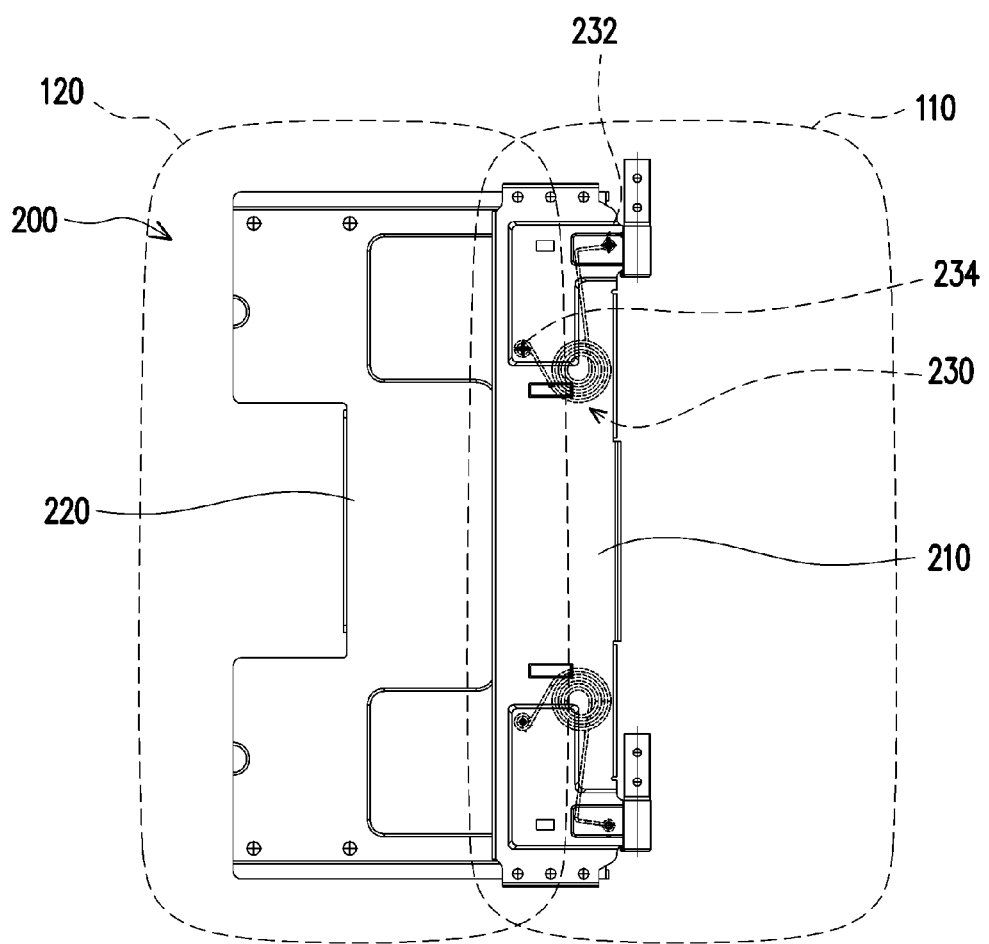

Referring to FIGS. 3, 7A, and 7B, the elastic element 230 may exert force with respect to the fixing frame 210 to the movable frame 220, so as to force the movable frame 220 to slide toward a direction opposite to one side or the other side of the fixing frame 210. When the movable frame 220 is slid to be positioned at one side of the fixing frame 210, the movable body 120 is at the first position with respect to the immovable body 110, as shown in FIG. 7A. When the movable frame 220 is slid to be positioned at the other side of the fixing frame 210, the movable body 120 is at the second position with respect to the immovable body 110, as shown in FIG. 7B.

According to the present embodiment, when the movable body 120 slides to the first position of FIG. 7A, the elastic element 230 is exposed outside of the fixing frame 210. When the movable body 120 slides to the second position of FIG. 7B, the fixing frame 210 hides the elastic element 230.

According to the present embodiment, the fixing frame 210 may further include a bent edge 214. As shown by FIGS. 2 and 3, the bent edge 214 extends from one side of the fixing frame 210 toward the movable frame 220. When the movable body 120 rotates to the third position of FIGS. 1C and 2, the bent edge 214 covers the elastic element 230 and prevents it from being seen.

Figure 8:
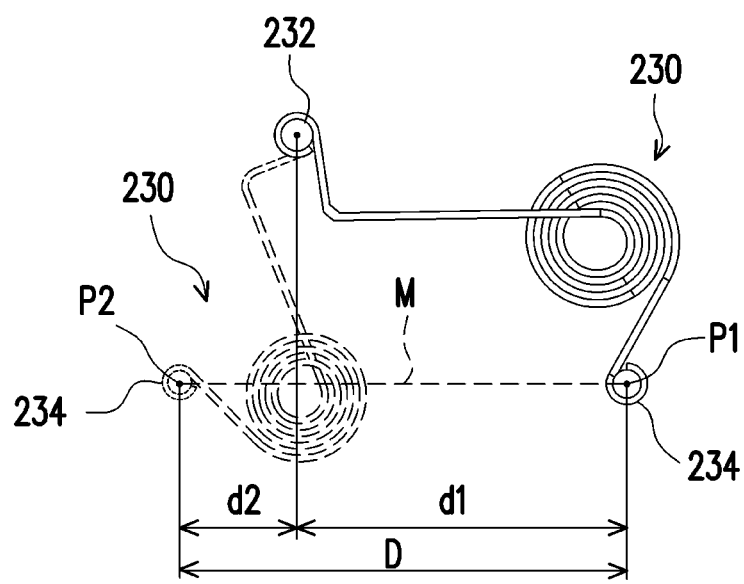
FIG. 8 illustrates the relative positions of the elastic element of FIGS. 7A and 7B.

Referring to FIG. 8, when the movable body 120 slides with respect to the immovable body 110 from the first position of FIG. 7A to the second position of FIG. 7B, the movable end 234 of the elastic element 230 moves relatively from a first stop position P1 to a second stop position P2 along a moving path M, wherein the distance from the orthographic projection of the fixing end 232 on the moving path M to the first stop position P1 is larger than the distance from the orthographic projection of the fixing end 232 on the moving path M to the second stop position P2.

According to the present embodiment, a first distance d1 from the orthographic projection of the fixing end 232 on the moving path M to the first stop position P1 is equal to two-thirds or four-sevenths of a whole distance D of the moving path M. In other words, a second distance d2 from the orthographic projection of the fixing end 232 on the moving path M to the second stop position P2 is equal to one-third or three-sevenths of the whole distance D of the moving path M. Furthermore, the length of the moving path M may be 36 mm, the first distance d1 from the orthographic projection of the fixing end 232 on the moving path M to the first stop position P1 may be 22.1 mm, and accordingly the second distance d2 from the orthographic projection of the fixing end 232 on the moving path M to the second stop position P2 is 13.9 mm.

Figure 9A:
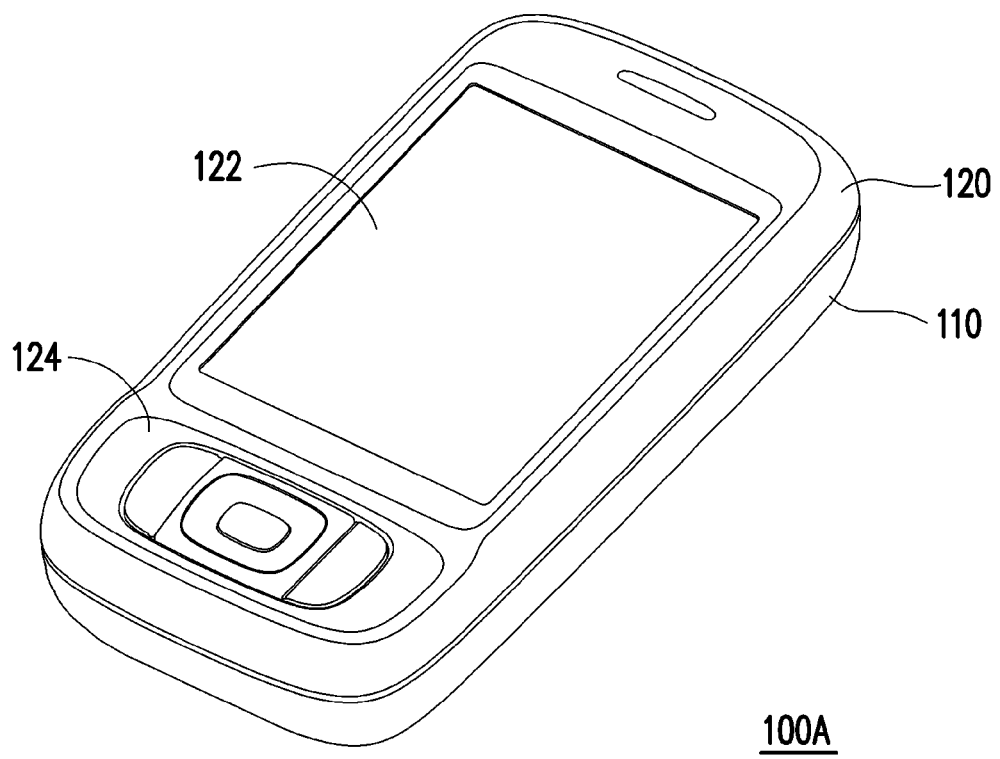
FIG. 9A is a portable electronic device according to another embodiment of the present application.
Figure 9B:
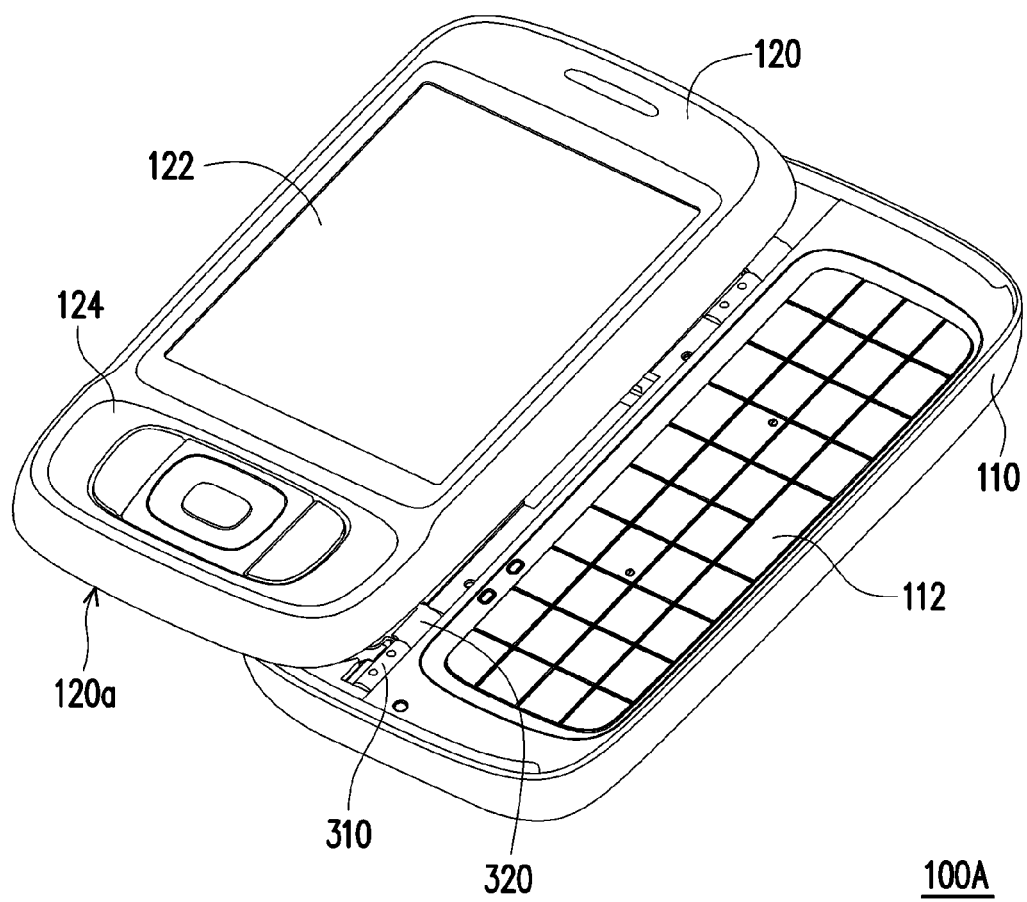
FIG. 9B illustrates that the movable body in FIG. 9A slides with respect to the immovable body from the slide position to the first rotation position.
Figure 9C:
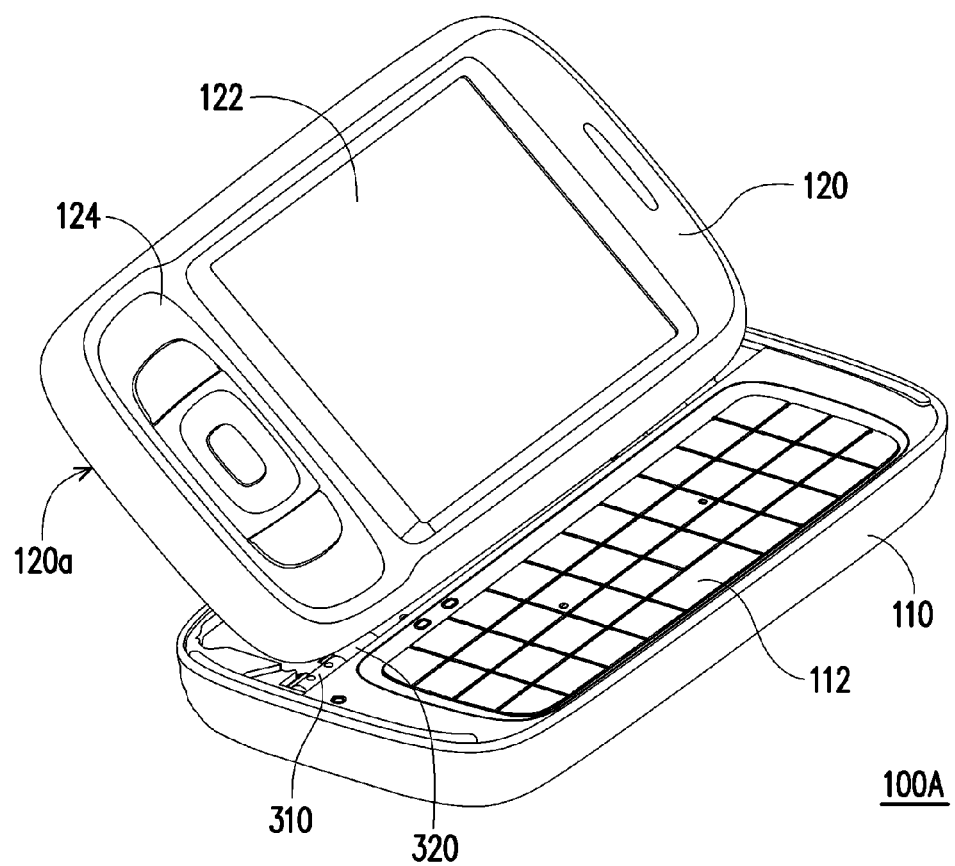
FIG. 9C illustrates that the movable body in FIG. 9B rotates with respect to the immovable body from the first rotation position to the second rotation position.
Figure 10:
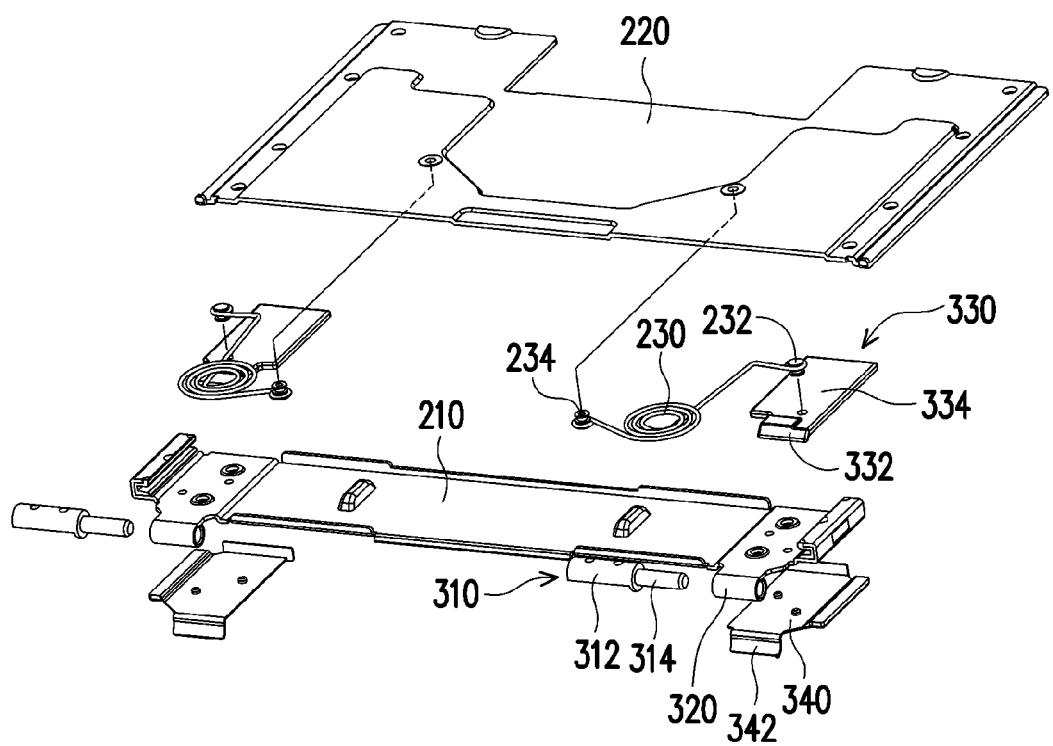
FIG. 10 illustrates the constitution of the sliding module and the rotation module in the embodiment shown by FIG. 9A.

FIG. 9A is a portable electronic device according to another embodiment of the present application. FIG. 9B illustrates that a movable body in FIG. 9A slides with respect to an immovable body from a slide position to a first rotation position. FIG. 9C illustrates that the movable body in FIG. 9B rotates with respect to the immovable body from the first rotation position to a second rotation position. FIG. 10 is a schematic view illustrating the constitution of the sliding module and the rotation module in FIG. 9A. Referring to FIGS. 9A to 9C and 10, similar to the portable electronic device 100 in FIG. 1A, a portable electronic device 100A of the present embodiment includes an immovable body 110 and a movable body 120 overlapping with the immovable body 110. The movable body 120 may include a display 122 and a button set 124. The immovable body 110 may include a keyboard 112. Therefore, the portable electronic device 100A may be operated through the display 122, the button set 124, the keyboard 112, and etc.

Furthermore, the portable electronic device 100A further includes a sliding module and a rotation module. The constitution of the sliding module and the rotation module is shown by FIG. 10. The sliding module is disposed between the immovable body 110 and the movable body 120, such that the movable body 120 may slide with respect to the immovable body 110 between a sliding position of FIG. 9A and a first rotation position of FIG. 9B by means of the sliding module. Furthermore, the rotation module is disposed between the immovable body 110 and the movable body 120, such that the movable body 120 may rotate, with respect to the immovable body 110, between the first rotation position of FIG. 9B and a second rotation position of FIG. 9C by means of the rotation module.

The sliding module includes a fixing frame 210 and a movable frame 220. The movable frame 220 is fixed to a back surface 120a of the movable body 120 and slidably coupled to the fixing frame 210. The rotation module includes a plurality of pivots 310 and a plurality of bearings 320. Each of the pivots 310 has a first section 312 connected to the immovable body 110 and a second section 314. Each of the bearings 320 is connected to the movable body 120 through the sliding module and is coupled with the second section 314 of the pivot 310.

According to the present embodiment, the bearings 320 of the rotation module are connected to the fixing frame 210 of the sliding module, and the bearing 320 and the fixing frame 210 may be formed integrally. However, according to another embodiment not shown, the bearings 320 may be independent parts and secured on the fixing frame 210 by way of riveting or screw locking.

Figure 11:
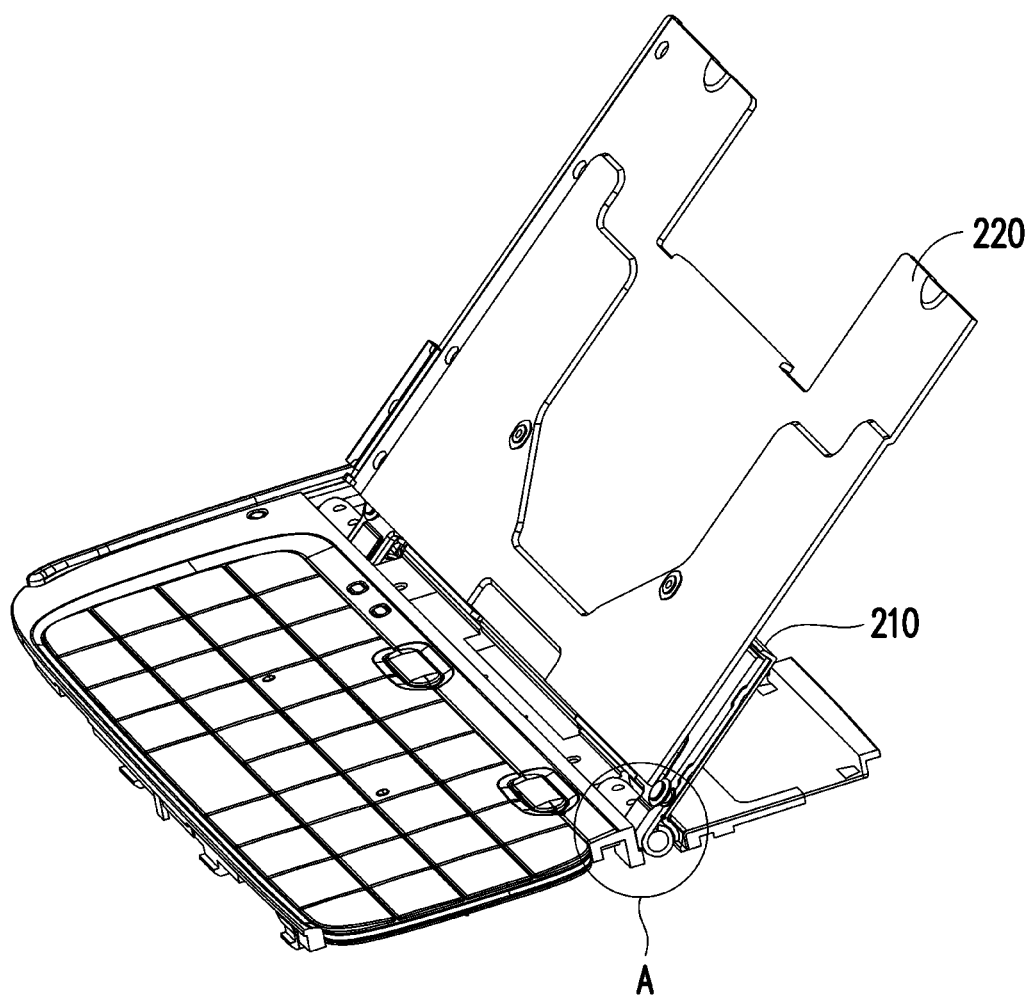
FIG. 11 is a partial sectional perspective view illustrating a portion of the immovable body, the sliding module, and the rotation module of the portable electronic device of FIG. 9C.
Figure 12:
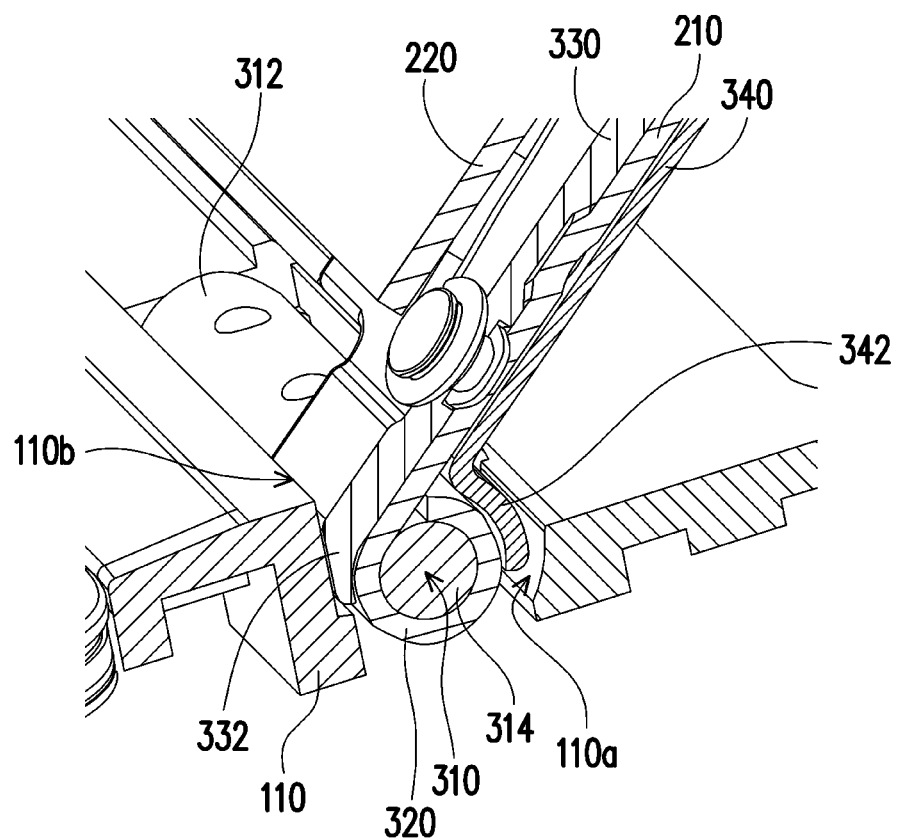
FIG. 12 is a magnified view of the area A in FIG. 11.

FIG. 11 is a partial sectional perspective view illustrating a portion of the immovable body, the sliding module, and the rotation module of the portable electronic device. FIG. 12 is a magnified view illustrating an area A in FIG. 11. Referring to FIGS. 10, 11, and 12, the immovable body 110 has a plurality of trenches 110a. The pivots 310 and the bearings 320 are respectively accommodated in the trenches 100a. Furthermore, the rotation module may further include a plurality of restraint elements 330, each of which covers the outside of the bearing 320 and has a restraint end 332.

According to the present embodiment, the restraint element 330 is made of metallic material and has a connection portion 334 secured to the fixing frame 210 of the sliding module 200. When the movable body 120 rotates from the first rotation position of FIG. 9B to the second rotation position of FIG. 9C, the restraint end 332 withstands an edge 110b of the trench 110a of the immovable body 110, such that the movable body 120 can not be rotated further and stopped at the second rotation position.

Referring to FIG. 10, in order to enable self-automatic sliding, the sliding module further has an elastic element 230 which includes a fixing end 232 connected to the restraint element 330 and a movable end 234 connected to the movable frame 220. According to the present embodiment, the elastic element 230 may be a torsion spring and the fixing end 232 is connected to the restraint element 330 by means of a rivet or a screw 311.

Referring to FIGS. 10, 11, and 12, the rotation module may further include a protection piece 340, which has a flange 342 covering a portion of the bearing 320. According to the present embodiment, the protection piece 340 is connected to the fixing frame 210 of the sliding module. Therefore, when the movable body 120 rotates to the second rotation position of FIG. 9C, the bearing 320 is protected by the flange 342 and prevented from being exposed.

Figure 13:
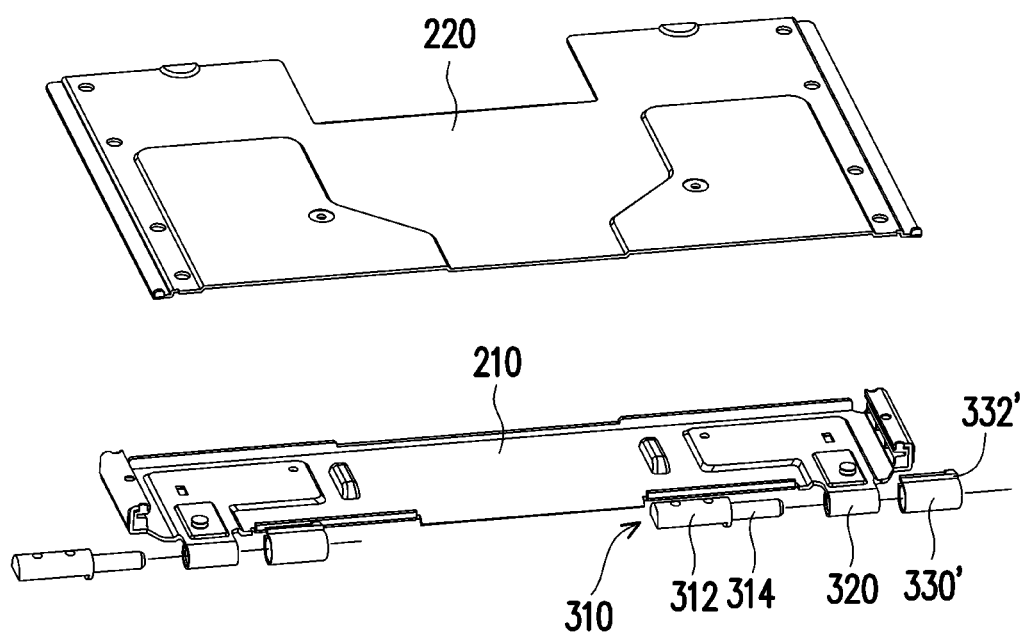
FIG. 13 illustrates some components of a portable electronic device according to another embodiment of the present application.

FIG. 13 is a portable electronic device according to another embodiment of the present application. Referring to FIG. 13, according to another embodiment of the present application, the restraint element 330' is a sleeve form and coupled with the bearing 320. Similarly, the restraint element 330' has a restraint end 332'. Therefore, when the movable body 120 rotates from the first rotation position of FIG. 9B to the second rotation position of FIG. 9C, the restraint end 332' withstands an edge 110b of the trench 110a of the immovable body 110, such that the movable body 120 can not be rotated further and stopped at the second rotation position.

In summary, the present invention provides on the portable electronic device the restraint mechanism including the blocker, the magnetic element, the restraint leaf spring. Therefore, when the movable body is rotatable with respect to the immovable body, the restraint mechanism stops the function of the sliding module, so as to prevent the edge of the movable body from applying force improperly on the immovable body.

Moreover, the present invention utilizes the elastic element disposed between the fixing frame and the movable frame to enable semi-automatic sliding, and the movable end of the elastic element moves, with respect to the fixing end of the elastic element, by two different distances on the moving path of the movable end. Furthermore, the elastic element may be covered by the bent edge of the fixing frame and prevented from being seen when the movable body is at the second position and the third position with respect to the immovable body.

Furthermore, the present invention utilizes the rotation module disposed between the immovable body and the movable body, such that the movable body may rotate with respect to the immovable body between the first rotation position and the second rotation position by means of the rotation module. Furthermore, the present invention may restrict the rotatable range of the movable body with respect to the immovable body by using the restraint end of the restraint element outside the bearing, so as to prevent undue rotation of the movable body with respect to the immovable body.

It should be noted that, the present invention is not limited to the scenario that the parts of the rotation module are assembled to the parts of the sliding module. In the scenario of having no sliding module, the parts of the rotation module may also be directly assembled to or formed on the movable body or the parts thereof.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A portable electronic device, comprising:
    an immovable body;
    a movable body;
    a sliding module disposed between the immovable body and the movable body, the movable body slidable with respect to the immovable body between a first position and a second position by means of the sliding module, and the sliding module comprising:
        a fixing frame fixed to the immovable body;
        a movable frame fixed to the movable body and slidably coupled to the fixing frame; and
        an elastic element having a fixing end fixed to the fixing frame and a movable end fixed to the movable frame, wherein when the movable body slides from the first position to the second position, the movable end relatively moves from a first stop position to a second stop position along a moving path, the distance from the orthographic projection of the fixing end on the moving path to the first stop position is larger than the distance from the orthographic projection of the fixing end on the moving path to the second stop position, the elastic element has a first rod connected to the movable end, a second rod connected to the fixing end, and an elastic main body connected between the first rod and the second rod, the second rod is longer than the first rod, the elastic element is covered by the fixing frame when the movable body slides with respect to the immovable body at the second position, the immovable body has a keyboard, when the movable body slides to the first position, the keyboard is covered by the movable body, and when the movable body slides to the second position, the keyboard is exposed outside of the movable body; and
    a restraint mechanism including:
        a blocker on the movable frame;
        a magnetic element disposed on the immovable body; and
        a restraint leaf spring having a fixing end fixed to the fixing frame and a free end having a first edge,
        wherein when the movable body slides between the first position and the second position, the free end of the restraint leaf spring is attached to the fixing frame by means of the magnetic attraction force of the magnetic element, and when the movable body rotates between the second position and the third position, the free end of the restraint leaf spring is not attracted by the magnetic element and released from the fixing frame, so that the first edge is against the blocker for resisting a pushing force exerted by the blocker, and thereby the movable body is restricted from sliding with respect to the immovable body.

2. The portable electronic device according to claim 1, wherein when the movable body slides to the first position, the elastic element is exposed by the fixing frame, and when the movable body slides to the second position, the elastic element is covered by the fixing frame.

3. The portable electronic device according to claim 1, wherein a distance from the orthographic projection of the fixing end on the moving path to the second stop position is equal to one-third or three-sevenths of the whole distance of the moving path.

4. The portable electronic device according to claim 1, wherein the movable frame has two edges parallel to each other, and the fixing frame has two hooks slidably coupled with the edges respectively.

5. The portable electronic device according to claim 1, wherein the fixing frame includes a bent edge and the bent edge extends from one side of the fixing frame toward the movable frame.

6. The portable electronic device according to claim 1, wherein the fixing frame includes at least a buffer bump disposed on the fixing frame for blocking the movable frame.

7. The portable electronic device according to claim 1, further comprising:
    a rotation module coupled between the fixing frame and the immovable body, wherein the movable body is rotatable with respect to the immovable body between the second position and a third position by means of the rotation module.

8. The portable electronic device according to claim 7, wherein the rotation module comprising:
    at least a pivot fix to the immovable body; and
    at least a bearing rotatably coupled with a segment of the pivot and fixed to the fixing frame of the sliding module.

9. The portable electronic device according to claim 8, wherein the immovable body has an upper surface, and the upper surface is provided with a trench thereon for accommodating the fixing frame and rotation module.

10. The portable electronic device according to claim 9, wherein when the movable body slides between the first position and the second position, the fixing frame is accommodated in the trench; and wherein when the movable body rotates from the second position to the third position, the fixing frame moves away from the trench.

11. A portable electronic device, comprising:
an immovable body;
a movable body; and
a restraint mechanism including:
  a blocker on the movable frame;
  a magnetic element disposed on the immovable body; and
  a restraint leaf spring having a fixing end fixed to the fixing frame and a free end having a first edge,
  wherein when the movable body slides between the first position and the second position, the free end of the restraint leaf spring is attached to the fixing frame by means of the magnetic attraction force of the magnetic element, and when the movable body rotates between the second position and the third position, the free end of the restraint leaf spring is not attracted by the magnetic element and released from the fixing frame, so that the first edge is against the blocker for resisting a pushing force exerted by the blocker, and thereby the movable body is restricted from sliding with respect to the immovable body.

12. The portable electronic device according to claim 11, wherein the restraint mechanism further comprising:
  a supporting element disposed on the fixing frame, and the free end has a second edge toward the supporting element, when the free end of the restraint leaf spring is released from the fixing frame, the supporting element supports the second edge to resist the pushing force.

13. The portable electronic device according to claim 11, wherein the free end has an inclined surface corresponding to the first edge for guiding the free end passing through the blocker and thus making the first edge return to be against the blocker again.

14. The portable electronic device according to claim 11, wherein the blocker is a screw which screws the movable frame on the movable body.

15. The portable electronic device according to claim 11, further comprising:
  a sliding module disposed between the immovable body and the movable body, the movable body slidable with respect to the immovable body between a first position and a second position by means of the sliding module, and the sliding module comprising:
    a fixing frame fixed to the immovable body;
    a movable frame fixed to the movable body and slidably coupled to the fixing frame; and
    an elastic element having a fixing end fixed to the fixing frame and a movable end fixed to the movable frame, wherein when the movable body slides from the first position to the second position, the movable end relatively moves from a first stop position to a second stop position along a moving path, and the distance from the orthographic projection of the fixing end on the moving path to the first stop position is larger than the distance from the orthographic projection of the fixing end on the moving path to the second stop position.

16. A portable electronic device, comprising:
an immovable body;
a movable body;
  a sliding module disposed between the immovable body and the movable body, the movable body slidable with respect to the immovable body between a first position and a second position by means of the sliding module, and the sliding module comprising:
    a fixing frame fixed to the immovable body; and
    a movable frame fixed to the movable body and slidably coupled to the fixing frame;
  a rotation module coupled between the sliding module and the immovable body, the movable body rotatable with respect to the immovable body between the second position and a third position by means of the rotation module, and the rotation module comprising:
    at least a pivot having a first section connected to the immovable body and a second section;
    at least a bearing connected to the sliding module and coupled with the second section of the pivot, wherein the bearing rotatably coupled with the second section of the pivot and fixed to the fixing frame of the sliding module; and
    a restraint element covering at least a portion of the bearing and having a restraint end,
    wherein when the movable body rotates to the third position, the restraint end withstands the immovable body; and
  a restraint mechanism including:
    a blocker on the movable frame;
    a magnetic element disposed on the immovable body; and
    a restraint leaf spring having a fixing end fixed to the fixing frame and a free end having a first edge,
    wherein when the movable body slides between the first position and the second position, the free end of the restraint leaf spring is attached to the fixing frame by means of the magnetic attraction force of the magnetic element, and when the movable body rotates between the second position and the third position, the free end of the restraint leaf spring is not attracted by the magnetic element and released from the fixing frame, so that the first edge is against the blocker for resisting a pushing force exerted by the blocker, and thereby the movable body is restricted from sliding with respect to the immovable body.

17. The portable electronic device according to claim 16, wherein the sliding module further comprises:
  an elastic element having a fixing end fixed to the fixing frame and a movable end fixed to the movable frame.

18. The portable electronic device according to claim 16, wherein the fixing frame and the bearing are formed integrally as a single unit.

19. The portable electronic device according to claim 16, wherein the restraint element has a connection portion secured to the fixing frame of the sliding module.

20. The portable electronic device according to claim 16, wherein the unmovable body has at least a trench, and the pivots and the bearing are accommodated in the trench, and
  when the movable body rotates to the third position, the restraint end withstands an edge of the trench.

21. The portable electronic device according to claim 16, wherein the restraint element is a sleeve form and coupled with the bearing.

* * * * *